United States Patent
Jeansonne et al.

(10) Patent No.: US 10,089,472 B2
(45) Date of Patent: Oct. 2, 2018

(54) EVENT DATA STRUCTURE TO STORE EVENT DATA

(71) Applicant: HEWLETT-PACKARD DEVELOPMENT COMPANY, L.P., Houston, TX (US)

(72) Inventors: Jeffrey Kevin Jeansonne, Houston, TX (US); Valiuddin Y Ali, Houston, TX (US); James M Mann, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/781,604

(22) PCT Filed: Apr. 23, 2013

(86) PCT No.: PCT/US2013/037728
§ 371 (c)(1),
(2) Date: Oct. 1, 2015

(87) PCT Pub. No.: WO2014/175864
PCT Pub. Date: Oct. 30, 2014

(65) Prior Publication Data
US 2016/0063255 A1  Mar. 3, 2016

(51) Int. Cl.
*G06F 21/57* (2013.01)
*G06F 9/44* (2018.01)
*G06F 9/4401* (2018.01)
*G06F 21/56* (2013.01)

(52) U.S. Cl.
CPC .......... *G06F 21/575* (2013.01); *G06F 9/4401* (2013.01); *G06F 21/566* (2013.01); *G06F 21/572* (2013.01); *G06F 2221/2101* (2013.01); *G06F 2221/2115* (2013.01)

(58) Field of Classification Search
CPC .... G06F 21/566; G06F 21/572; G06F 21/575; G06F 2221/2101; G06F 2221/2115; G06F 9/4401
See application file for complete search history.

(56) References Cited

U.S. PATENT DOCUMENTS

| 7,203,808 | B2 * | 4/2007 | Rothman | G06F 3/0614 |
| | | | | 711/114 |
| 7,483,810 | B2 | 1/2009 | Jackson et al. | |
| 9,251,380 | B1 * | 2/2016 | Au | G06F 21/602 |

(Continued)

FOREIGN PATENT DOCUMENTS

| CN | 102239472 | 11/2011 |
| WO | WO-2012148422 | 11/2012 |

OTHER PUBLICATIONS

Hodge et al., International Application No. PCT/US13/37725 entitled Redundant System Boot Code in a Secondary Non-Volatile Memory, filed Apr. 23, 2013 (25 pages).

(Continued)

*Primary Examiner* — Abdelmoniem Elamin
(74) *Attorney, Agent, or Firm* — Trop, Pruner & Hu, P.C.

(57) ABSTRACT

An event data structure is stored in a non-volatile memory that is electrically isolated from a bus accessible by a processor. In response to an event relating to operation of a controller that is separate from the processor, the controller adds event data for the event into an entry of the event data structure.

15 Claims, 3 Drawing Sheets

(56) References Cited

U.S. PATENT DOCUMENTS

| | | |
|---|---|---|
| 2003/0079007 A1 | 4/2003 | Merkin et al. |
| 2003/0212936 A1 | 11/2003 | Neuman et al. |
| 2005/0210180 A1* | 9/2005 | Rothman ............... G06F 3/0614 711/6 |
| 2006/0168435 A1* | 7/2006 | Svensson .............. G06F 9/4405 713/1 |
| 2008/0066075 A1* | 3/2008 | Nutter ..................... G06F 9/485 718/107 |
| 2008/0072030 A1* | 3/2008 | Karpa ....................... G06F 8/65 713/2 |
| 2008/0090653 A1* | 4/2008 | Kuehling ................ G07F 17/32 463/29 |
| 2008/0195750 A1* | 8/2008 | Sadovsky ............... G06F 21/78 709/234 |
| 2008/0307134 A1 | 12/2008 | Geissler et al. |
| 2010/0115187 A1 | 5/2010 | Wu et al. |
| 2010/0169551 A1 | 7/2010 | Yano et al. |
| 2012/0079174 A1 | 3/2012 | Nellans et al. |
| 2013/0047031 A1 | 2/2013 | Tabone et al. |
| 2015/0381647 A1 | 12/2015 | Huang |
| 2016/0211977 A1* | 7/2016 | Kohiyama ............... G09C 1/00 |

OTHER PUBLICATIONS

Jeansonne et al., International Application No. PCT/US13/37724 entitled Recovering From Compromised System Boot Code filed Apr. 23, 2013, (29 pages).

Jeansonne et al., International Application No. PCT/US13/37727 entitled Configuring a System filed Apr. 23, 2013 (35 pages).

Jeansonne et al., International Application No. PCT/US13/37729 entitled Repairing Compromised System Data in a Non-Volatile Memory filed Apr. 23, 2013 (25, (25 pages).

Jeansonne et al., International Application No. PCT/US13/37733 entitled Retrieving System Boot Code From a Non-Volatile Memory filed Apr. 23, 2013, (26 pages).

Jeansonne et al., International Application No. PCT/US13/37735 entitled Verifying Controller Code and System Boot Code filed Apr. 23, 2013 (36 pages).

Patelay; "A Single-chip Solution for System-supervisory Functions", <http://www.embedded-control-europe.com/digitalissues/ecejun10/files/ecejun10.pdf>, Jun. 2010 (44 pages).

\* cited by examiner

EVENT DATA STRUCTURE TO STORE EVENT DATA

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

BRIEF DESCRIPTION OF THE DRAWINGS

Some implementations are described with respect to the following figures.

DETAILED DESCRIPTION

Figure 1:
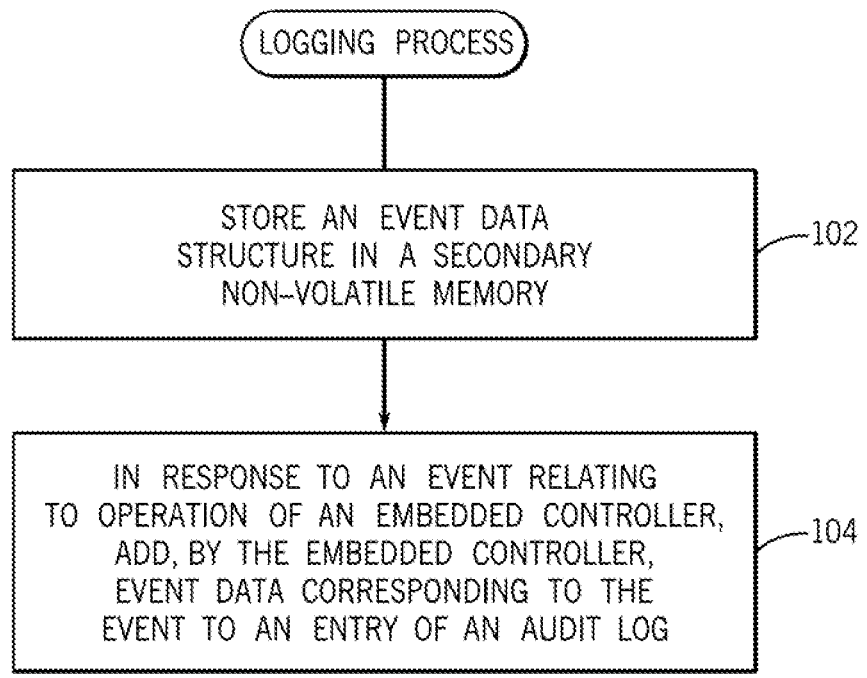
FIG. 1 is a flow diagram of a logging process according to some implementations.

Malware attacks on system code used to perform startup of a computing system can cause the integrity of the computing system to be compromised such that unauthorized access and operations in the computing system can occur. For example, compromised system code can allow covert remote monitoring and/or control of the computing system by a malicious entity, unauthorized access and/or modification of data in the computing system by malware, disablement of the computing system, and so forth. Compromised system code can refer to system code that has been corrupted such that the system code is no longer usable, or alternatively, compromised system code can refer to system code that has been changed in some way but that is still able to execute. Note that system code can also be compromised accidentally or intentionally.

Although a protection mechanism can be provided in a computing system to protect the system code, such protection mechanism may become compromised under certain conditions, which can subject the system code to malware attacks.

System code used to perform startup of a computing system can include system firmware, which can be in the form of machine-readable instructions stored in non-volatile memory and executable on a processor (or processors) of the computing system. "System firmware" can cover any machine-readable-instruction that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

In the present discussion, although reference is made to "system firmware," it is noted that techniques or mechanisms can be applied to other types of system boot code, where system boot code can refer to any code that can boot a computing system after restart the computing system or can resume the computing system from a low power state.

Various types of system data can be stored in the non-volatile memory of a computing system. The system data is accessed during operation of the computing system to ensure correct operation of the computing system. The system data can be stored in various data structures in the non-volatile memory, and can relate to a configuration of at least one physical component of the computing system. For example, the system data can relate to a configuration of the computing system, or alternatively, the system data can relate to a configuration of an individual physical component or multiple physical components of the computing system.

The system data in the non-volatile memory may be compromised due to unauthorized access and operations in the computing system, such as by malware. Additionally, the system data in the non-volatile memory may be compromised inadvertently. Once system data is compromised, correct operation of the computing system may not be possible.

To protect system firmware and/or system data from being compromised, either due to a malware attack or unintentional action, a secondary non-volatile memory can be provided in addition to a primary non-volatile memory that is used to store a copy of the system firmware and system date. The system firmware copy on the secondary non-volatile memory can be a duplicate of the system firmware in the primary non-volatile memory. Alternatively, the system firmware copy in the secondary non-volatile memory may be different version (later version or earlier version) than the system firmware in the primary non-volatile memory. Similarly, a copy of the system data can be stored in a secondary non-volatile memory. The system data copy can be identical to the system data in the primary non-volatile memory, or be of a different version (earlier version or later version) of the system data in the primary non-volatile memory.

When various events, such as compromise of system firmware or system data, occur, it is desired that event data corresponding to such events be logged in a secure manner to allow for a detection and understanding, such as by an administrator, of what events occurred in the computing system. The logged event data can be protected against loss due to power outage of the computing system, and can be protected against tampering, such as by malware or other code. In the ensuing discussion, reference is made to logging event data. Note that the term "logging" is used interchangeably with "auditing," which can refer generally to an entity monitoring an event of a target system, and recording event data in response to the event.

FIG. 1 is a flow diagram of a logging process according to some implementations. The logging process stores (at 102) an event data structure (e.g. an audit log) in the secondary non-volatile memory. The secondary non-volatile memory is electrically isolated from a bus that is accessible by a processor (or processors) of the computing system. In response to an event relating to operation of an embedded controller, the embedded controller adds (at 104) event data corresponding to the event to an entry of the audit log. Event data can also be added to the audit log in response to other types of events, as further described below. An embedded controller is a controller in the computing system that is separate from the processor(s) of the computing system, and the embedded controller is used for performing various designated tasks (discussed further below).

In the ensuing discussion, reference is made to storing event data in an audit log. In other examples, event data can be stored in other types of event data structures.

Figure 2:
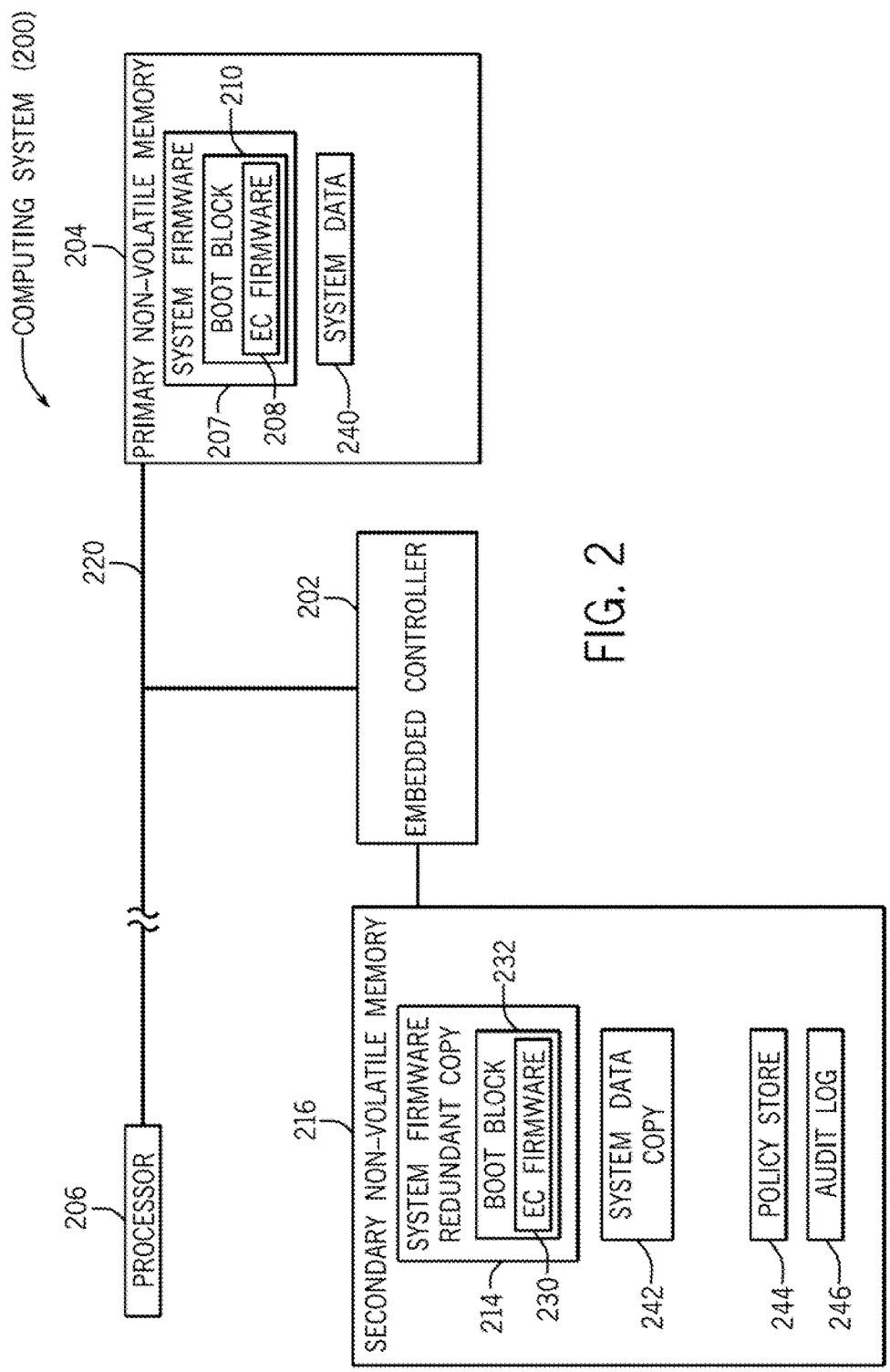
FIG. 2 is a block diagram of an example computing system that incorporates some implementations.

FIG. 2 is a block diagram of an example computing system 200 that includes an embedded controller 202, a primary non-volatile memory 204, a processor 206, and a secondary non-volatile memory 216. The primary non-volatile memory 204 is a shared non-volatile memory that it is accessible by multiple entities, including the embedded controller 202 and at least one other entity (including the processor 206). The secondary non-volatile memory 216 is accessible by the embedded controller 202, but is inaccessible to the processor 206 or to other components in the computing system 200 (effectively, the secondary non-volatile memory 216 is electrically isolated from entities other than the embedded controller 202). Making the secondary non-volatile memory 216 inaccessible to the processor 206 and other components protects the content of the secondary non-volatile memory 216 from unauthorized tampering. The secondary non-volatile memory 216 can be accessible by the embedded controller 202 at all times.

Although not shown in FIG. 1, an input/output (I/O) controller may be provided between the processor 206 and the primary non-volatile memory 204. The I/O controller is part of the core logic of the computing system 200. The processor 206 can access the shared bus 220 through the I/O controller to retrieve content of the primary non-volatile memory 204.

The secondary non-volatile memory 216 can be physically separate from the primary non-volatile memory 204 (such as implemented in different physical memory devices). Alternatively, the secondary non-volatile memory 216 and the primary non-volatile memory 204 can physically reside on a common memory device, but the primary non-volatile memory 204 and the secondary non-volatile memory 216 are in different segments of the physical memory device, where the segment of the physical memory device that contains the secondary non-volatile memory 216 is accessible by only the embedded controller 202. In other words, the segment that contains the secondary non-volatile memory 216 is under exclusive control of the embedded controller 202, and this segment can be locked from access by the processor 206 or another entity during runtime of the computing system 200, after an initial boot period.

The primary non-volatile memory 204 is accessible over the shared bus 220 by the embedded controller 202 or by another entity. In some implementations, just one entity can have access to the shared bus 220 at any given time, such that just one entity can access the primary non-volatile memory 204 at a time. In some examples, the shared bus 220 is a shared Serial Peripheral Interface (SPI) bus. An SPI bus is a synchronous serial data link in which devices on the SPI bus operate in a master-slave mode. In other examples, another type of shared bus 220 can be used. In alternative examples, an arbitration mechanism can be provided to allow for shared access of the bus 220 in various states of the computing system, including a low power state and a normal runtime state.

The primary non-volatile memory 204 can store system firmware 207, which can include BIOS code. The system firmware 207 can include EC firmware 208 that is for execution by the embedded controller 202, and a boot block 210 that is to be executed by the processor 206.

In examples according to FIG. 2, the EC firmware 208 is included in the boot block 210 of the system firmware 207. Including the EC firmware 208 inside the boot block 210 can provide an indication that the EC firmware 208 has been signed by the entity that provided the system firmware 207, which can be the vendor of the computing system 200, or another entity. In other examples, the EC firmware 208 can be separate from the boot block 210.

Although reference is made to EC firmware that can be executed in an embedded controller, it is noted that other types of controller code (e.g. application software in the form of machine-readable instructions) can also be executed in the embedded controller.

The boot block 210 is a part of the BIOS code, and is first executed when the computing system 200 starts up. The boot block 210 is executed first before the rest of the BIOS code is allowed to execute on the processor 206. The boot block 210 can be used to check the integrity of the BIOS code as well as to perform other initial functions. If the boot block 210 confirms the integrity of the BIOS code, then the boot block 210 can pass control to the main portion of the BIOS code for initiating the remaining operations associated with the BIOS code.

In some implementations, the boot block 210 can include core root of trust for measurement (CRTM) logic, which is logic specified by the Trusted Computing Group (TCG), an industry standard work group. During a power on procedure of the computing system 200, the CRTM logic can perform certain initialization tasks and can make a number of measurements that are stored for later use. The CRTM logic can then check the BIOS code before passing control to the main portion of the BIOS code. Once the BIOS code completes execution and passes control to the OS, the OS can verify the trustworthiness of the computing system 200 based on measurements taken by the CRTM logic.

The embedded controller 202 is physically separate from the processor 206 of the computing system 200. The processor 206 is used for executing the OS, application code, and other code in the system 200. The embedded controller 202, on the other hand, can be used to perform specific predefined tasks, as programmed into the EC firmware 208. Examples of tasks that can be performed by the embedded controller 202 include any one or some combination of the following: power supply control in the computing system 200 (for controlling a power supply that supplies power supply voltages to various components in the computing system 200), charging and control of a battery in the computing system 200, thermal monitoring (to monitor a temperature in the computing system 200), fan control (to control a fan in the computing system 200), and interaction with a user input device (such as performing a scan of a keyboard of the computing system 200 or interaction with a pointing device such as a mouse, touchpad, touchscreen, and so forth). The embedded controller 202 can be implemented with a microcontroller, an application-specific integrated circuit (ASIC), a programmable gate array (PGA), or any other type of programmable circuit.

The secondary non-volatile memory 216 stores a redundant copy 214 of system firmware, where the system firmware redundant copy 214 includes a boot block 232 and an EC firmware 230. The system firmware redundant copy 214 in the secondary non-volatile memory 216 can be a duplicate of the system firmware 207 in the primary non-volatile memory 204. Alternatively, the system firmware redundant copy 214 may be a different version (later version or earlier version) than the system firmware 207.

In some implementations, the system firmware redundant copy 214 includes just the boot block 232, but does not include the main portion of the BIOS code. In other implementations, the system firmware redundant copy 214 can include the entirety of the BIOS code.

The primary non-volatile memory 204 can also store system data 240, which can relate to a configuration of at least one physical component of the computing system 200. The secondary non-volatile memory 216 can also store a copy 242 of the system data, where the system data copy 242 in the secondary non-volatile memory 216 can be identical to or a different version from the system data 240 in the primary non-volatile memory 204.

Copying of the system firmware and system data to the secondary non-volatile memory 216 can be performed by the embedded controller 202, such as in response to instructions received from the system firmware 207 during manufacture or service of the computing system 200 at a factory or service facility.

The system data 240 can include machine unique data, which can refer to any configuration data or settings that are unique to each particular computing system. Examples of machine unique data can include any or some combination of the following: product name, product model, stock-keeping unit (SKU) number (for identifying the respective computing system for sale), a serial number of the computing system, a system or commodity tracking number (for identifying a system board of the computing system), a system configuration identifier (for identifying a configuration of the computing system), warranty data (for describing a warranty associated with the computing system), a universally unique identifier (UUID), a default setting of BIOS code, and so forth. The foregoing is provided as examples of machine unique data; in other examples, other or additional types of machine unique data can be provided.

The system data 240 can also include configuration data of a network controller of the computing system. The network controller can be used to communicate over a network according to a network protocol, such as an Ethernet protocol (e.g. Gigabit Ethernet protocol or other type of Ethernet protocol), or another type of protocol. In examples where the network protocol supported by the network controller is the Gigabit Ethernet (GbE) protocol, the configuration data of the network controller can include data in a GbE region of the non-volatile memory. The GbE region is a data structure containing configuration data (e.g. programmable settings) for the network controller that can be part of the computing system. The programmable settings are read by the network controller upon deassertion of a bus reset signal on a bus to which the network controller is connected.

In other examples, the system data 240 can include data in a Descriptor region in the non-volatile memory. The Descriptor region is a data structure containing information that describes a layout of the non-volatile memory that stores system firmware, and configuration parameters for an input/output (I/O) controller, such as the Platform Controller Hub (PCH) from Intel Corporation, or another type of I/O controller. The PCH can include various functions, including a display interface to a graphics subsystem, a system bus interface to a system bus to which various 110 devices can be connected, and so forth. The I/O controller can read the data in the Descriptor region upon exit of the I/O controller from reset.

In other examples, additional or alternative system data can be copied from the primary non-volatile memory 204 to the secondary non-volatile memory 216. The system data copy 242 thus provides a backup copy of the system data 240, such as a backup copy of the machine unique data, GbE region data, and Descriptor region data.

In some examples, upon saving the system data copy 242 to the secondary non-volatile memory 216, the embedded controller 202 can calculate at least one hash, checksum, or other value (generally referred to as a "check value") based on the content of the system data 240. This at least one check value can be saved to the secondary non-volatile memory 216 and associated with the system data copy 242. One check value can be computed for each of the different pieces of the system data 240, including, for example, the machine unique data, GbE region data, and Descriptor region data. The check values can be saved into the secondary non-volatile memory 216 in association with respective ones of the machine unique data copy, GbE region data copy, and the Descriptor region data copy (that are part of the system data copy 242).

The check values associated with various pieces of system data in the secondary non-volatile memory can be used later to verify that the content of such system data has not changed.

The secondary non-volatile memory 216 further stores a policy store 244 to store policy information, and an audit log 246 to store event data relating to events associated with the embedded controller 202 and/or system firmware 207, and/or other events.

The policy information can pertain to policies relating to execution of the controller code on the embedded controller 202. For example, at least one of the policies can relate to updating of system firmware upon detecting that the system firmware has been compromised. Another example policy can specify whether an aggressive mode of operation is to be used, where aggressive mode enables verification of system firmware (to check whether the system firmware has been compromised) in every case where the processor will execute a boot block of the system firmware. Another example policy specifies whether a manual or automated recovery mode is to be used, where a manual recovery mode involves a user action before recovery of a compromised system firmware is allowed to be performed. A further example policy specifies whether a locked or unlocked mode is to be used, where locked mode causes system firmware to be locked to a specific version, such as the version in the secondary non-volatile memory.

After the secondary non-volatile memory 216 is configured (which includes copying of the system firmware and various system data to the secondary non-volatile memory 216), the embedded controller 202 can monitor the integrity of the content (code and data) stored in the primary non-volatile memory 204 and/or secondary non-volatile memory 216 to ensure that the content has not been compromised due to malware, a code bug, or other cause.

The integrity check of the content in the secondary non-volatile memory 216 can be performed each time the embedded controller 202 at various times, such as when the computing system 200 comes out of reset, during a low power state of the computing system 200, or during runtime of the computing system 200.

Event data can be added to the audit log 246 in the secondary non-volatile memory 216 in response to various events. The adding of event data to the audit log 246 can be controlled by the embedded controller 202. Alternatively, addition of event data to the audit log 246 can be controlled by a trusted portion (e.g., boot block 210) of the system firmware 207 executing on the processor 206. The boot block 210 can access an interface, such as an application programming interface (API), of the embedded controller 202, to send an instruction to the embedded controller 202 pertaining to event data to be added to the audit log 246. In response to an instruction from the boot block 210 relating to event data, the embedded controller 202 can add the specified event data to the audit log 246.

The integrity of the boot block 210 can be verified by the embedded controller 202 prior to loading the boot block 210 onto the processor 206 for execution by the processor 206. Because the integrity of the boot block 210 is verified by the embedded controller 202 prior to execution of the boot block 210, the boot block 210 is considered a trusted portion of the system firmware 207.

After the boot block 210 passes control to a remaining portion of the system firmware 207, then the system firmware 207 may no longer be trusted, and the interface, such as the API, of the embedded controller 202 that was previously accessible by the boot block 210 can be disabled. For example, the boot block 210 can send a command to the embedded controller 202 to disable the API accessible by the processor 206 (that relates to updating the audit log 246) prior to the boot block 10 passing control to the remaining portion of the system firmware 207. In this way, a technique or mechanism is provided to ensure that only the trusted portion of the system firmware 207 has access to sensitive instructions relating to updates of the audit log 246.

To re-enable the API to allow update of the audit log 246 in response to instructions from the boat block 210, the following conditions are to be met, according to some implementations: (1) the boot block 210 has been successfully verified by the embedded controller 202, and (2) the computing system 200 is resuming or starting up from a low power state that is one of specified low power states. The specified power states can include the S4 and S5 states according to the Advanced Configuration and Power Interface (ACPI) standard. The ACPI standard provides far various ACPI states, including: the ACPI S3 state (which is a form of a standby or sleep state in which the system context of the computing system 200 is maintained in volatile memory that remains powered while some components of the computing system 100 are powered off); the ACPI S4 state (which is a form of hibernation state in which the system context is saved to persistent storage to allow power to be removed from additional computing system components, including volatile memory); and the ACPI S5 state (which is a form of system off state, in which power has been removed from even more components of the computing system 200).

Examples of events detectable by the embedded controller 202 that can trigger the addition of event data to the audit log 246 by the embedded controller 202 include the following:

Event relating to failure to load the EC firmware 230 from the secondary non-volatile memory (or the EC firmware 208 from the primary non-volatile memory 204) into the embedded controller 202;

Event relating to compromised or missing boot block 210 in the primary non-volatile memory 204;

Event relating to compromised or missing boot block 232 in the secondary non-volatile memory 216;

Event relating to compromised or missing system data in the primary non-volatile memory 204 or secondary non-volatile memory 216;

Event relating to updating the boot block 210 in the primary non-volatile memory 204 with the boot block 232 in the secondary non-volatile memory 216;

Event relating to updating the boot block 232 in the secondary non-volatile memory 216 with the boot block 210 in the primary non-volatile memory 204;

Event relating to repairing the system data in the primary non-volatile memory 204 or secondary non-volatile memory 216;

Event relating to an incorrect version of the boot block 210 in the primary non-volatile memory 204, in a scenario where a BIOS update policy is in a locked mode (where locked mode causes system firmware to be locked to a specific version, such as the version in the secondary non-volatile memory 216);

Event relating to an incorrect version of the boot block 232 in the secondary non-volatile memory 216, in a scenario where the BIOS update policy is in the locked mode;

Event relating to a recovery of the system firmware 207 being on hold, pending receipt of a manual recovery input from a user;

Event relating to receipt of a manual recovery command relating to recovery of the system firmware 207;

Event relating to integrity check failure of the audit log 246;

Event relating to integrity check failure of the policy store 244;

Event relating to a change of a manufacturing mode of the computing 200.

More generally, events that trigger the addition of event data to the audit log 246 by the embedded controller 202 include events relating to operation of the embedded controller 202. These events include those listed above, which can be generally listed as: an event relating to failure to load controller code to the controller; an event relating to compromise of system boot code; an event relating to update of the system boot code; an event relating to compromise of system data that relates to a configuration of at least one physical component of a computing system; an event relating to repair of the system data; an event relating to incorrect version of the system boot code; an event relating to manual recovery of the system boot code; an event relating to compromise of the event data structure; an event relating to compromise of a policy store; or an event relating to changing a manufacturing mode.

Although various events are listed above, it is noted that in alternative implementations, other events can also trigger the addition of event data to the audit log 246 by the embedded controller 202.

The trusted portion of the system firmware 207, such as the boot block 210, can also control the storing of event data to the audit log 246 in response to certain events. Examples of such events include the following:

Event relating to repair of the system firmware 207, where the system firmware 207 may have been repaired using a copy of the system firmware from the secondary non-volatile memory 216, from a persistent storage such as a disk-based storage, or from an external removable storage medium (such as a Universal Serial Bus or USB storage device);

Event relating to compromise of the system firmware 207;

Event relating to inability to find a recovery image for the system firmware 207;

Event relating to compromise of the machine unique data or other system data as detected by the system firmware 207

Event relating to repair, by the system firmware 207, of compromised machine unique data or other system data from a copy of the machine unique data or other system data from the secondary non-volatile memory 216;

Event relating to detecting, by the system firmware 207, corrected or missing variables of the system firmware 207, where a variable can refer to a parameter that is used by the system firmware 207 during operation of the system firmware 207;

Event relating to reverting, by the system firmware 207, compromised or missing system firmware variables to default settings;

Event relating to a recovery of the system firmware 207 being on hold, pending receipt of a manual recovery input from a user;

Event relating to receipt of a manual recovery command relating to recovery of the system firmware 207.

In other examples, other events can also trigger the trusted portion of the system firmware 207 to cause the adding of system data to the audit log 246.

The foregoing events relating to operation of the system firmware 207 can be generally listed as: an event relating to compromise of the system boot code; an event relating to repair of the system boot code; an event relating to an inability to find a recovery image of the system boot code; an event relating to compromise of system data relating to a configuration of at least one physical component of a computing system; an event relating to repair of the system data; an event relating to compromise of a variable of the system boot code; an event relating to repair of the variable of the system boot code; and an event relating to manual recovery of the system boot code.

Using techniques or mechanisms according to some implementations, various events relating to operation of the embedded controller 202 and the system firmware 207 can be logged into the audit log 246. By storing the audit log 246 in the secondary non-volatile memory 216, event data is not lost due to power loss of the computing system 200.

Also, by disabling the interface to the embedded controller 202 after the boot block 210 passes control to the remaining portion of the system firmware 207, protection is provided against tampering with the content of the audit log 246 by malware or other code running on the processor 206.

In addition, in some implementations, techniques or mechanisms can be provided to prevent tampering of event data that is sent to a recipient, where the recipient can be either in the computing system 200 or outside of the computing system 200. Also, techniques or mechanisms are provided to allow the recipient to verify the authenticity and source of the event data received from the audit log 246.

Event data is sent to a recipient to allow for analysis of the event data. The recipient can be a remote computing system that is associated with an administrator, for example. Alternatively, the recipient can be a tool executable in the computing system 200 for analyzing event data.

In some implementations, the embedded controller 202 can associate a timestamp with each event data added to the audit log 246, where the timestamp can be obtained from a secure time source, such as a time source according to a secure Network Time Protocol (NTP). Use of a secure time source allows a user of the computing system 200 to be assured that a timestamp in an audit log entry as recorded in the secondary non-volatile memory 216 is correct.

In addition, a secure memory, such as that provided by a Trusted Platform Module (TPM), can be used to store an encryption key, which can be specific to the computing system 200 or specific to a user. TPM refers to a mechanism according to a TPM Specification that describes a secure cryptographic processor that can be used to store cryptographic keys that protect information. The TPM Specification is provided by the Trusted Computing Group.

The encryption key, which can be a private key, stored in the secure memory can be used by the embedded controller 202 to digitally sign and encrypt event data in the audit log 246. A recipient that receives event data from the audit log 246 can use a corresponding public key to verify the digital signature produced based on digital signing of the event data. The public key can also be used to decrypt the event data. In this way, the recipient can confirm that the event data has not been compromised and is from a trusted source.

Figure 3:
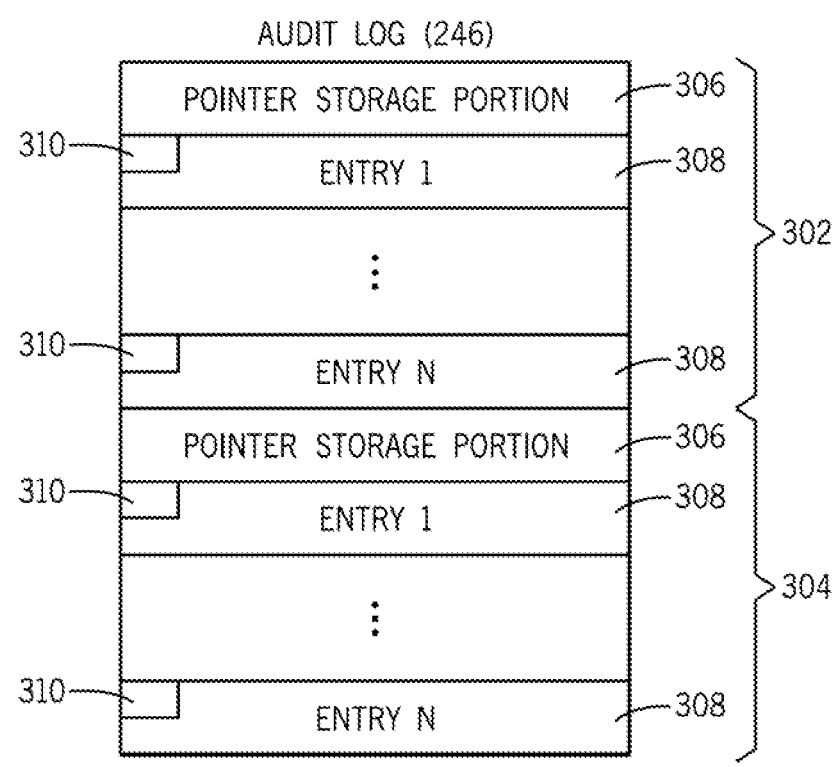
FIG. 3 is a schematic diagram of an audit log according to some implementations.

FIG. 3 is a schematic diagram of an example of the audit log 246. In FIG. 3, the audit log 246 includes two sectors 302 and 304. In other examples, the audit log 246 can include just one sector, or can include more than two sectors. A sector can refer to any specified portion of the secondary non-volatile memory 216 that is used to store the audit log 246.

In some examples, the secondary non-volatile memory 216 can be a flash memory device. With a flash memory device, data bits can be individually written, but an erase is performed on a block-by-block basis, where a block is some specified size. A sector of the audit log 246 can be the size of a block of the flash memory device that can be erased.

Each sector 302 or 304 includes a pointer storage portion 306 and multiple entries 308 to store event data (there can be N entries in each sector, where N≥2). The pointer storage portion 306 contains a pointer to a most recent entry of the audit log 246. For example, the pointer storage portion 306 can be in the form of a bitmap that has multiple bits, where each of the bits correspond to a different one of the entries 308. The embedded controller 202 adds event data to the entries 308 in sequence. For example, first event data is added to a first entry 308, a subsequent event data is added to a second entry 308, and so forth.

As event data is added to a given entry 308, the corresponding bit of the bitmap 306 is set to a specified value, e.g. "0", to indicate that the given entry 308 is the most recent entry 308 to which event data has been added. The embedded controller 202 can use the bitmap 306 to quickly locate the next entry 308 for adding new event data.

Each entry 308 is also associated with respective status information 310. The status information 310 can indicate a state of the respective entry 308. The indicated state can be one of multiple possible states, including an empty state the entry 308 is empty and does not contain event data), a new entry state indicating that event data has been added to the entry 308, a sent state indicating that the event data has of the entry 308 has been sent to a recipient, and an erased state indicating that the event data of the entry 308 is to be erased.

When event data is added to a given entry 308, the corresponding status information 310 is updated from the empty state to the new entry state. When the event data of the given entry 308 is sent to a recipient, then the status information 310 of the given entry 308 is updated to the sent state. Using the status information 310 of the entries 308, the embedded controller 202 is able to gather just entries having new event data (those marked with the new entry state), rather than the entirety of the audit log 246.

As event data is added to the entries 308 of the first sector 302 of the audit log 246, the first sector 302 becomes full when its last entry 308 is written with event data. Once the first sector 302 becomes full, the embedded controller 202 continues to write new event data to entries 308 of the second sector 304. As each entry i (i=1 to N) in the second sector 304 is written with event data, the status information 310 of the corresponding entry i in the first sector 302 is marked with the state indicating that the entry i is to be erased.

Once the embedded controller 202 reaches the end of the second sector 304, all of the entries 308 in the first sector would have been marked with the state indicating that the entries 308 are to be erased. At this point, the embedded controller 202 can send a command to erase the first sector 302 of the secondary non-volatile memory 216. The first sector 302 can then be used to add new event data.

In some examples, the audit log 246 can be implemented as a wrap-around buffer. Thus, when an end of the audit log 246 is reached (end of the second sector 304 is reached), the audit log 246 can wrap around to the beginning of the first sector 302 to insert the next event data into the first entry 308 of the first sector 302. Implementing the audit log 246 as a wrap-around buffer addresses the issue of there being a finite amount of storage space available to store the audit log. In some examples, a policy can be specified to determine when to continue recording event data into the audit log 246 when the end of the wrap-around buffer is reached, since performing the wrapping would lead to overwriting older event data in the audit log 246. For example, a policy can specify that adding of event data is to pause when the end of the buffer is reached, until the older event data to be overwritten has been saved elsewhere.

Another issue associated with a wrap-around buffer is the potential loss of the total count of recorded events. To address this issue, several techniques can be used, such as techniques that employ a direct or indirect monotonic counter. A direct monotonic counter is one that provides an explicit count value that represents the number of event data that have been written to the audit log 246. This count value can become quite large over time as entries continue to be added.

In alternative examples, an indirect monotonic counter can be used. The indirect monotonic counter can use two counters—a log counter to count through a number of entries in the audit log 246, and a loop counter to count the number of loops (cycles) through the audit log 246. When event data is added to a log entry of the audit log 246, the log counter is incremented by one. Once the log counter increments to a maximum value indicating that the end of the audit log 246 has been reached, the loop counter can be incremented by one. Thus, a loop counter value of zero indicates that a complete cycle of the audit log 246 has not yet completed, and the log counter points to the actual current entry of the audit log 246. If the loop counter has a non-zero value N, then that indicates that N cycles have be performed through the audit log 246, and that N*M log entries have been written, where M represents the number of entries in the audit log 246.

In other implementations, instead of implementing the audit log 246 with multiple sectors, a single-sector audit log can be used instead.

As noted above, events that can trigger the addition of event data to the audit log 246 include events relating to failure to load embedded controller code or compromise of system firmware 207.

During an initialization procedure of the embedded controller 202, the embedded controller 202 is able to verify the EC firmware (230 and/or 208) retrieved from a non-volatile memory (216 and/or 204). An initialization procedure refers to a procedure that is performed when the embedded controller 202 first starts after the embedded controller 202 has been reset or after a power cycle of the embedded controller 202 (where power is removed from and then re-applied to the embedded controller 202).

In some implementations, the embedded controller 202 can first attempt to use the EC firmware 230 in the secondary non-volatile memory 216 during a restart of the computing system 200. If the embedded controller 202 is unable to successfully use the EC firmware 230, then the embedded controller 202 can use the EC firmware 208 in the primary non-volatile memory 204 in an attempt to start the computing system 200. If the embedded controller 202 is unable to start the system using either of the EC firmware 230 or the EC firmware 208, then an error has occurred since the EC firmware cannot be loaded into the embedded controller 202 for execution, which is likely due to compromise of both the EC firmware 230 and the EC firmware 208. Event data can be added to the audit log 246 to reflect this event.

Although reference is made to first attempting to use the EC firmware 230 in the secondary non-volatile memory 216 before attempting to use the EC firmware 208 in the primary non-volatile memory 204, different implementations can first attempt to use the EC firmware 208 in the primary non-volatile memory 204 before attempting to use the EC firmware 230 in the secondary non-volatile memory 216.

In addition, once the EC firmware is verified and loaded for execution on the embedded controller 202, the EC firmware can verify system firmware (e.g. system firmware 207 retrieved from the primary non-volatile memory 204) prior to each restarted execution of the system firmware by the processor 206. Restarted execution of the system firmware can occur due to a cold reset of the computing system 200, a resume from a low power state of the computing system 200, an operating system restart, and so forth. It is noted that the system firmware can also be verified by the EC firmware each time the computing system 200 enters a low power state.

A low power state of the computing system 200 refers to a state of the computing system 200 in which the processor 206 and certain other hardware components of the system 200 are off (e.g. no power is provided to the processor and the certain other hardware components). In the low power state, power can still be provided to the embedded controller 202. The computing system 200 can transition to a low power state in any of the following scenarios; (1) as part of a cold reset of the computing system 200 that caused the system 200 to be powered off for subsequent power on, or (2) as part of a power savings procedure, in which the computing system 200 can transition from a normal operating state to a sleep stat hibernation state, or an off state after a time period of inactivity, or in response to detecting a low battery condition, or in response to user or application command, or for another reason, or (3) in any other scenario. Examples of low power states can include certain Advanced Configuration and Power Interface (ACPI) states.

In further examples, the EC firmware can perform verification of the system firmware in response to a warm reset of the computing system 200, in which the computing system 200 is restarted without removing power to the computing system 200. To allow the EC firmware to perform the verification in response to the warm reset, the computing system 200 can be forced to transition to an appropriate low power state when the warm reset is detected.

In other examples, the EC firmware can perform the verification at any time, even when the computing system is not in a low power state. For example, the EC firmware can perform the verification when the processor is idle or not accessing the shared non-volatile memory 204. The verification by the EC firmware can also be performed in "real-time," as the system firmware is retrieved for execution by the processor.

The foregoing ensures, prior to each instance of the processor 206 restarting execution of the system firmware 207, that the system firmware 207 has not been compromised.

In some examples, the embedded controller 202 can include cryptographic hardware, which can perform cryptographic computations, such as those used in the verifying of the EC firmware and the system firmware. The cryptographic hardware can be in the form of circuitry that is configured to perform cryptographic computations.

The embedded controller 202 can further include a read-only memory (ROM), which can be used to store a boot loader and an encryption key. The encryption key can be the key (public key or private key) used to perform verification of the EC firmware. During system startup, the boot loader is loaded from the ROM to execute in the embedded controller 202 to retrieve EC firmware from the secondary or primary non-volatile memory 216 or 204 into a random access memory (RAM) of the embedded controller 202.

In some implementations, signatures can be associated with the EC firmware and boot block stored in the primary non-volatile memory 204 and/or the secondary non-volatile memory 216. The signatures can be used in the verification of the respective EC firmware and boot block. Use of a signature in the verification process can allow a determination of the authenticity of the respective EC firmware or boot block, and a determination that the respective EC firmware or boot block has not been compromised.

In some implementations, the verification of the EC firmware can be accomplished by decrypting the respective signature using the encryption key stored in the embedded controller ROM. Decrypting the signature produces a respective value (e.g. hash value) that can be compared with a corresponding calculated value (e.g. hash value) of the EC firmware. If the foregoing values match, then the EC firmware is verified. A similar process can be used for verifying the BIOS boot block using the respective digital signature.

Other events that can trigger the logging of event data to the audit log 246 include events relating to system data that is stored in the primary and secondary non-volatile memories 204 and 216.

To verify the integrity of each of the various pieces of system data stored in the secondary non-volatile memory 216, the embedded controller 202 can calculate a check value based on the respective piece of system data, and compare the calculated check value to the stored hash or other value in the secondary non-volatile memory 216. A match indicates that the respective piece of system data is valid. A non-match indicates that the respective piece of system data has changed, which is an indication of the piece of system data being compromised.

The embedded controller 202 can also determine whether system data in the primary non-volatile memory 204 is compromised, based on either the system data copy 242 or based on the check value(s) in the secondary non-volatile memory 216. The check value(s) (associated with system data) stored in the secondary non-volatile memory 216 can be used (by the system firmware 207 or the embedded controller 202) to verify the integrity of the respective piece of system data 240 in the primary non-volatile memory 204. The system firmware 207 or embedded controller 202 can calculate the check value based on the piece of system data 240, and can compare the calculated check value with the check value stored in the secondary non-volatile memory 216. If the check values match, then the system firmware 207 or embedded controller 202 determines that the piece of system data 240 in the primary non-volatile memory 204 is valid. On the other hand, if the check values do not match, then the system firmware 207 or embedded controller 202 determines that the piece of system data 240 has been compromise.

In other implementations, instead of using the check values stored in the secondary non-volatile memory 216, each specific piece of the system data 240 in the primary non-volatile memory 204 can be verified by comparing to the respective piece of system data copy 242 in the secondary non-volatile memory 216. For example, the machine unique data, GbE region data, or Descriptor region data in the primary non-volatile memory 204 can be compared to the respective copy of the machine unique data, GbE region data, or Descriptor region data, to determine whether the respective piece of data has changed, which indicates that the respective piece of data has been compromised.

To correct a respective piece of system data copy 242 in the secondary non-volatile memory 216 that was detected as being compromised, the computing system 200 can be placed into a manufacture programming mode (discussed further below) to remedy the issue. Note that the manufacture programming mode is a mode that can be entered into at a factory or at a service facility, and not in the field at a user site. Entering or exiting the manufacture programming mode can be logged as event data in the audit log 246.

The integrity of the audit log 246 can also be verified by the embedded controller 202. Verification of the integrity of the audit log 246 can include verifying that the physical structure of the audit log is correct and ready to receive audit log events. If the embedded controller 202 determines that the audit log 246 in the secondary non-volatile memory 216 is damaged in such a way that the embedded controller 202 would no longer be able to add new events to the audit log 246, the embedded controller 202 can repair the structure of the audit log 246. Upon repairing the audit log structure, the embedded controller 202 can add an event to the audit log indicating that a structural problem of the audit log was detected and repaired.

To verify the integrity of policy information in the policy store 244, the embedded controller 202 can store a measurement of the policy store in the secondary non-volatile memory 216 each time the policy information is updated. The measurement may be in the form of a hash, checksum, or other value based on the policy information stored in the policy store. The embedded controller 202 can calculate the measurement and confirm that the measurement matches the policy store measurement value to verify the policy store integrity. If there is no match, that is an indication that the policy store 244 has been compromised. Compromise of the policy store 244 can be logged in the audit log 246.

If the embedded controller 102 determines a data integrity issue is in the policy store in the secondary non-volatile memory 216, the embedded controller 202 can revert the policy information (e.g. policy information that can be user-controlled) to default values and commit the default values back to the secondary non-volatile memory 216. Such an event can also be logged in the audit log 246.

As noted above, the computing system 200 can be placed in a manufacture programming mode at a factory or service facility. In the manufacture programming mode, service personnel can set or change system firmware content and system data in the primary non-volatile memory 204. For example, the system firmware 207 can be updated, or system data (such as the machine unique data, GbE region data, and Descriptor region data) can be modified.

In some examples, the service personnel, using an application, can access the system firmware settings using an interface, such as the Windows Management Instrumentation (WMI) interface, or other type of interface, while the computing system 200 is in the manufacture programming mode. The manufacture programming mode is available at a factory or at a service facility that is to perform repair or other servicing of computing systems. In the manufacture programming mode, various system data, such as the machine unique data, GbE region data, and Descriptor region data, can be cleared in the secondary non-volatile memory 216. This allows new backup copies of the machine unique data, GbE region data, and Descriptor region data to be copied from the primary non-volatile memory 204, which can be performed to fix compromised system data in the secondary non-volatile memory 216, for example.

Machine-readable instructions of various modules described above are loaded for execution on a processing circuit (e.g. embedded controller 202 or processor 206). A processing circuit can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What claimed is:

1. A method comprising:
    storing, in a non-volatile memory that is electrically isolated from a bus accessible by a processor, an event data structure;
    in response to an event relating to operation of a controller that is separate from the processor, adding, by the controller, event data for the event into an entry of the event data structure;
    in response to an event detected by a system boot code, sending, by the system boot code, an instruction to the controller to add further event data corresponding to the event detected by the system boot code into a second entry of the event data structures; and
    disabling, by a first portion of the system boot code, updating of the event data structure prior to passing control to a second portion of the system boot code.

2. The method of claim 1, wherein the event relating to the operation of the controller is selected from among: an event relating to failure to load controller code to the controller; an event relating to compromise of system boot code; an event relating to update of the system boot code; an event relating to compromise of system data that relates to a configuration of at least one physical component of a computing system; an event relating to repair of the system data; an event relating to incorrect version of the system boot code; an event relating to manual recovery of the system boot code; an event relating to compromise of the event data structure; an event relating to compromise of a policy store; or an event relating to changing a manufacturing mode.

3. The method of claim 1, wherein sending the instruction comprises sending the instruction through an interface to the controller to add the further event data into the second entry of the event data structure.

4. The method of claim 3, wherein sending the instruction is performed by a boot block of the system boot code, and wherein the boot block causes disabling of the interface to the controller prior to passing control to a remaining portion of the system boot code.

5. The method of claim 1, wherein the event detected by the system boot code is selected from among: an event relating to compromise of the system boot code; an event relating to repair of the system boot code; an event relating to an inability to find a recovery image of the system boot code; an event relating to compromise of system data relating to a configuration of at least one physical component of a computing system; an event relating to repair of the system data; an event relating to compromise of a variable of the system boot code; an event relating to repair of the variable of the system boot code; or an event relating to manual recovery of the system boot code.

6. The method of claim 1, further comprising:
    associating time information with the event data relating to the operation of the controller, the time information obtained from a secure time source.

7. An article comprising at least one non-transitory machine-readable storage medium storing instructions that upon execution cause a system to:
    store, in a non-volatile memory that is electrically isolated from a bus accessible by a processor that is separate from a controller, an event data structure;
    in response to an event relating to operation of the controller that is separate from the processor, add event data for the event into an entry of the event data structure;
    digitally sign the event data using an encryption key; and
    disable, by a first portion of a system boot code, updating of the event data structure in the non-volatile memory prior to passing control to a second portion of the system boot code.

8. The method of claim 1, wherein the controller is an embedded controller.

9. The method of claim 1, further comprising:
    after the disabling of the updating of the event data structure, re-enabling the updating of the event data structure in response to:
        verifying, by the controller, an integrity of the first portion of the system boot code, and
        determining, by the controller, that a computer including the controller is resuming or starting up from a low power state.

10. The method of claim 1, further comprising:
digitally sign, by the controller, event data in the event data structure.

11. The article of claim 7, wherein the instructions upon execution cause system to:
store, in the non-volatile memory, a redundant copy of a portion of a system boot code.

12. The article of claim 7, wherein the instructions upon execution cause system to:
receive, from the system boot code in response to an event detected by the system boot code, an instruction to add further event data corresponding to the event detected by the system boot code into another entry of the event data structure.

13. A computing system comprising:
a processor;
a system boot code;
a non-volatile memory to store an event data structure, the non-volatile memory electrically isolated from a bus accessible by the processor, wherein the event data structure has a plurality of sectors comprising a first sector that includes a pointer and a plurality of entries, the pointer to point to one of the entries to which event data was most recently added, the plurality of sectors further comprising a second sector including another pointer and another plurality of entries; and
an embedded controller to:
in response to a first event relating to operation of the embedded controller that is separate from the processor, add event data for the first event into an entry of the event data structure,
receive, from the system boot code in response to a second event detected by the system boot code, an instruction to add further event data corresponding to the second event detected by the system boot code into a second entry of the event data structure,
add the further event data to the second entry of the event data structure in response to the instruction,
in response to the first sector becoming full, successively add additional event data to respective entries of the second sector while successively marking entries of the first sector as erased, and
in response to all entries of the first sector being marked as erased, perform an erase operation of the first sector.

14. The computing system of claim 13, wherein each of the entries of the first and second sectors includes status information to indicate that a corresponding entry has one of a plurality of states, wherein the plurality of states include an empty state, a state indicating that event data has been added to the corresponding entry, a state indicating that the event data has been sent to a recipient, and a state indicating that the event data is to erased.

15. The computing system of claim 13, wherein a boot block of the system boot code is executable on the processor to:
detect the second event; and
send the instruction to the embedded controller through an interface.

* * * * *

UNITED STATES PATENT AND TRADEMARK OFFICE
CERTIFICATE OF CORRECTION

PATENT NO.         : 10,089,472 B2
APPLICATION NO.    : 14/781604
DATED              : October 2, 2018
INVENTOR(S)        : Jeffrey Kevin Jeansonne et al.

It is certified that error appears in the above-identified patent and that said Letters Patent is hereby corrected as shown below:

In the Claims

In Column 16, Line 2, Claim 1, delete "structures;" and insert -- structure; --, therefor.

Signed and Sealed this
Nineteenth Day of February, 2019

Andrei Iancu
*Director of the United States Patent and Trademark Office*